UNITED STATES PATENT OFFICE.

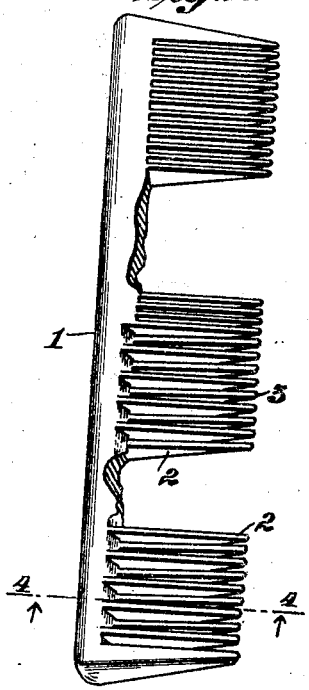

FREDERICK W. GRELL, OF NEW YORK, N. Y., ASSIGNOR TO AMERICAN HARD RUBBER COMPANY, A CORPORATION OF NEW YORK.

COMB.

No. 795,829. Specification of Letters Patent. Patented Aug. 1, 1905.

Application filed April 6, 1905. Serial No. 254,086.

*To all whom it may concern:*

Be it known that I, FREDERICK W. GRELL, a citizen of the United States, and a resident of College Point, in the borough of Queens, in the city and State of New York, have invented certain new and useful Improvements in Combs, of which the following is a specification.

My invention relates to improvements in combs, and particularly to dressing-combs such as are used by ladies in combing out their hair. It provides a comb the teeth of which are staggered—*i. e.*, arranged to alternately extend laterally farther from the median line of the comb.

It further consists in reducing the weight and bulk of the comb by waving the back in correspondence with the staggering of the teeth, and, further, in waving the edges of the teeth, and particularly the outer or exposed edge of each tooth.

In the drawings, Figures 1, 2, and 3 represent in elevation different forms or modifications of my device. Figs. 4, 5, and 6 are transverse sections through the lines 4 4, 5 5, and 6 6 of Figs. 1, 2, and 3, respectively. Fig. 7 is a partial top plan or back view of the comb shown in either Figs. 2 or 3.

Referring to Figs. 1 and 4, 1 designates the back of a comb, of which the teeth 2 are alternately set to extend to the edge of the back at their bases at one side and be in line therewith, each tooth being narrowed so that at its opposite side it does not extend to the side plane of the back. As shown, the points 3 of the teeth 2 are in alinement with each other. In the drawings I have shown the coarse or dressing end of the comb as provided with staggered teeth or teeth which alternately extend farther from the median line of the back, and the fine end of the comb is provided with teeth of the usual form extending from side to side of the back. It is of course obvious that the staggered teeth shown at the dressing end of the comb might as well extend for its entire length, if this is desired.

Referring to Fig. 2, I have shown the back 12 as laterally waved, the crest 121 of each wave corresponding with and forming a continuation of the outwardly-extending side of a tooth 22, the other side of each tooth extending and being in a plane with the sinus or depression 122 between the crests 121 on the back 12.

The back 13 of the comb shown in Fig. 3 is similar to the back 12 of the comb shown in Fig. 2, and the teeth 23 are similar to those shown in Fig. 2, except that the outer edge of each alternate tooth—that is, the edge corresponding with the crest 131—is provided with waves 231, similar to those shown in my pending application, Serial No. 186,944, filed December 29, 1903. The inner edges of the teeth, or those which correspond with the sinuses 132 of the back, are shown as straight.

It is found in practice that a comb made with teeth staggered as above described is much more effective in combing out heavy and abundant heads of hair, especially when the same are somewhat matted and entangled. In addition the teeth can be made of a given base width and corresponding strength, with a relatively heavy and strong back.

By the term "staggered teeth" as used in the specification and claims herein I of course intend to be understood as referring to teeth the base portions, at least, of which are alternately out of line with each other—that is, teeth which have their edges alternately extending farther from the median line of the comb.

Without limiting myself as to choice of materials or the particular forms of construction shown, what I claim is—

1. A comb having a back and staggered teeth integral therewith, the bases of the teeth extending on both sides of the longitudinal median line of the back.

2. A comb having a back and staggered teeth integral therewith, the bases of the teeth being of approximately equal width and extending on both sides of the longitudinal median line of the back.

3. A comb having a back and tapered teeth integral therewith, the bases of the teeth extending on both sides of the longitudinal median line of the back and one edge of each tooth extending a greater distance from such median line than the corresponding edge of the adjacent tooth.

4. A comb having a laterally-waved back and staggered teeth, the edge-lines of the teeth and the crests and sinuses of the back being approximately continuous.

5. A comb having a back formed with waves alternately disposed on its opposite sides and staggered teeth, the edge-lines of which are approximately continuous of the crests and sinuses of the waved back.

6. A comb having an integral back and tapered teeth, the bases of which extend on both sides of the longitudinal median line of the back and the edges of which extend alternately to a greater distance from the median line of the back than an adjacent tooth, the extended edges being waved.

7. A comb having a laterally-waved back and staggered teeth, the edge-lines of the teeth and the crests and sinuses of the back being approximately continuous, the edge-lines of those teeth which are continuous of the crests of the back being waved.

In testimony whereof I have signed this specification in the presence of two subscribing witnesses.

FREDERICK W. GRELL.

Witnesses:
  WILLIAM HOLLWEG,
  CARL A. HORNBERGER.